(12) United States Patent
Arcens

(10) Patent No.: US 7,088,237 B2
(45) Date of Patent: Aug. 8, 2006

(54) ENHANCED USER PRIVACY FOR MOBILE STATION LOCATION SERVICES

(75) Inventor: Suzanne Arcens, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 27 days.

(21) Appl. No.: 10/779,109

(22) Filed: Feb. 13, 2004

(65) Prior Publication Data

US 2004/0176104 A1 Sep. 9, 2004

Related U.S. Application Data

(60) Provisional application No. 60/447,563, filed on Feb. 14, 2003, provisional application No. 60/490,765, filed on Dec. 12, 2003.

(51) Int. Cl.
*G08B 1/08* (2006.01)

(52) U.S. Cl. ............................ 340/539.13; 340/539.11; 340/990

(58) Field of Classification Search ........... 340/539.11, 340/539.13, 539.17, 539.2, 573.1, 573.4, 340/905, 988, 990, 991, 995.14; 455/414.1; 375/350; 709/202
See application file for complete search history.

(56) References Cited

U.S. PATENT DOCUMENTS

| | | | |
|---|---|---|---|
| 5,611,050 A * | 3/1997 | Theimer et al. ............ 709/202 |
| 6,100,806 A * | 8/2000 | Gaukel .................... 340/573.4 |
| 6,167,255 A * | 12/2000 | Kennedy et al. .......... 455/414.1 |
| 6,360,102 B1 | 3/2002 | Havinis et al. ............. 455/457 |
| 6,640,184 B1 * | 10/2003 | Rabe .......................... 701/207 |
| 6,904,110 B1 * | 6/2005 | Trans et al. ................. 375/350 |
| 2002/0193941 A1 | 12/2002 | Jaeckle et al. | |
| 2003/0008672 A1 | 1/2003 | Fujii | |

\* cited by examiner

*Primary Examiner*—Van T. Trieu
(74) *Attorney, Agent, or Firm*—Philip Wadsworth; Bruce W. Greenhaus; Andrea L. Mays

(57) ABSTRACT

A method and apparatus for enhanced user control of location information for mobile devices. The method and apparatus provide user control within the mobile station of privacy policies that supervise responses to requests for location information. In an exemplary embodiment the mobile station includes a Privacy Engine, a Position Determination Module, and a User Interface. The Privacy Engine is a software module that controls the responses of the mobile station to location requests. The Privacy Engine preferably includes a Privacy Policy that may be modified by the mobile station user by means of wireless downloads, the User Interface, or by locally connected devices such as a personal computer, personal digital assistant, or laptop. Advantageously, the Privacy Engine or the Privacy Policy may be downloaded to the mobile station by means of a wireless data network or other data connection such as Bluetooth, infrared connection, Universal Serial Bus, etc.

37 Claims, 5 Drawing Sheets

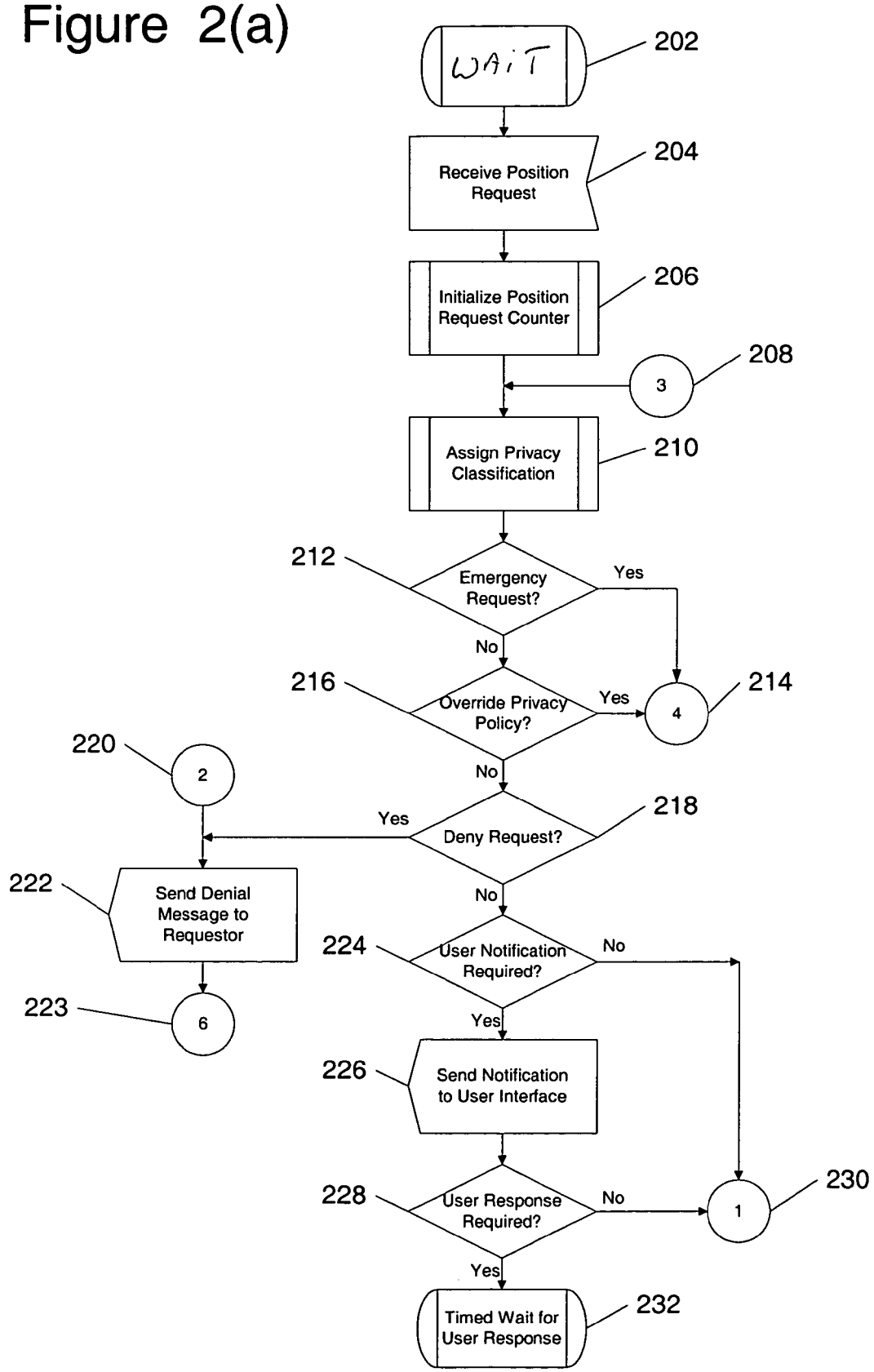

ENHANCED USER PRIVACY FOR MOBILE STATION LOCATION SERVICES

CROSS REFERENCE TO PENDING PROVISIONAL APPLICATION

This application claims the benefit under 35 U.S.C. § 119(e) of pending U.S. Provisional Application No. 60/447,563, filed Feb. 14, 2003, entitled "Enhanced User Privacy for Mobile Station Location Services", and U.S. Provisional Application No. 60/490,765, filed Dec. 12, 2003, hereby incorporated by reference herein in its entirety.

BACKGROUND

1. Field

This invention relates to the field of location services for mobile devices, and more paritcularly to enhanced user control of privacy policy for responses to location requests.

2. Description of Related Art

Location services (abbreviated as LCS, for "LoCation Services") for mobile telephones and wireless digital communication devices (collectively referred to hereinafter as Mobile Stations) are an increasingly important business area for wireless communication providers. This importance is reflected in the establishment of standards and functional specifications for LCS. Three exemplary LCS references are: 3rd Generation Partnership Project (3GPP), Technical Specification Group (TSG) Services and System Aspects, Functional stage 2 (SA2) description of LCS, Release 6, (3GPP TS 23.271 V6.0.0), June, 2002; Technical Document (TD) S2-022360, 3GPP TSG-SA2 Meeting #26, Toronto, Canada, August 19-23, 2002; and 3rd Generation Partnership Project (3GPP), Technical Specification Group (TSG) Services and System Aspects, Functional stage 2 (SA2) description of LCS, Release 6, (3GPP TS 23.271 V6.3.0), March, 2003. The references are referred to hereinafter as 3GPP-R1, 3GPP-R2, and 3GPP-R3 respectively.

References 3GPP-R1 and 3GPP-R3 describe a functional model of an entire LCS system, including sections relating to user privacy. Reference 3GPP-R2 describes a network element, referred to as a Privacy Profile Register (PPR), that maintains the LCS privacy information of subscribers and that facilitates corresponding privacy functions. These incorporated references provide an overview of recent technology and standards relating to LCS and related LCS privacy operations. Numerous methods and apparatus for providing LCS to subscribers in accordance with these references are known to persons with ordinary skill in the communications arts.

One known advantageous method for determining the location of a Mobile Station in a wireless communication system employs the Global Positioning System (GPS). Including a GPS device (or more generally, a Position Determination module, or "PDM") in the Mobile Station provides very accurate position determination capability. When a PDM is used as the primary means for providing accurate location information within a Mobile Station, the service provider network must contact the Mobile Station when requests for accurate location are received. Methods and apparatus for implementing the location service function using a PDM, such as using GPS in a Mobile Station, are well known to persons of ordinary skill in the wireless communications arts. Handsets implementing LCS functions using GPS are currently available. An exemplary GPS system for mobile stations is described the reference "An Introduction to SnapTrack™ Server-Aided GPS Technology," M. Moeglein and N. F. Krasner, Institute of Navigation (ION) GPS 1998 Proceedings, Sep. 15–18, 1998, pp. 333–344. A recent patent application that describes a GPS system suitable for mobile stations is "Method and Apparatus for Measurement Processing of Satellite Positioning System (SPS) Signals," L. Sheynblat and N. F. Krasner, U.S. Patent Application 20020050944, May 2, 2002.

Disadvantageously, user control of privacy policy information is very limited and inflexible using existing LCS privacy methods wherein user privacy is managed by a service provided network. For example, in some exemplary prior art LCS privacy methods, various classes of requestor clients are defined by the service provider, and a user privacy profile, such as the PPR referred to above, based on these classes is established when the user initiates service. In accordance with these LCS privacy methods, the privacy profile designates certain requestor classes that have unrestricted access to the user location, and other requestor classes that have restricted access. Such restrictions may, for example, include an automatic denial of LCS information to specific restricted classes. The restrictions may also include a requirement that the user be notified and (optionally) approve LCS access requests by requestors from specified restricted classes. In these exemplary prior art systems, privacy profile modifications may only be effected by modifying the service agreement between the provider and the user. In cases where user location is primarily determined by a PDM resident within the Mobile Station, an additional modification option is effected by disabling the PDM. Although this option enhances privacy by enabling the user to prevent the retrieval of accurate position information, the usefulness of this approach is extremely limited because it prevents accurate location retrieval for all requestor classes until the PDM is once again enabled.

The present disclosure is directed to a method and apparatus for LCS privacy management within a Mobile Station. The present disclosure enables convenient and flexible LCS control by a Mobile Station user.

SUMMARY

The present disclosure relates to a method and apparatus for providing the geographical location of a wireless mobile station, and more particularly to methods and apparatus for providing enhanced user control of privacy policies that supervise responses to requests for location information. These requests are hereinafter referred to as location requests or, equivalently, as position requests.

In one exemplary embodiment, a privacy control system for a Mobile Station comprises a Privacy Engine, a Position Determination Module (PDM), and a User Interface. The Privacy Engine is a software module that controls the responses of the Mobile Station to location requests.

The Privacy Engine further includes a Privacy Policy. The Privacy Policy includes Privacy Classes for classifying location requestors and their associated location requests, and Privacy Rules for determining the response to location requests for each Privacy Class.

A Privacy Class is defined by a list of location requesters and applications. The location requestors and applications may be individually specified, or grouped into categories or types, based on identifying information such as a URL, an Internet domain, or other data that may be supplied with a position request. A location request is classified according to the location requestor. Location requests can thereby be assigned to a Privacy Class based on information provided with the location request. Examples of Privacy Classes include, without limitaion: a default Privacy Class for unknown or undeclared location request applications and requestor identities not specifically included in any other class; a default Privacy Class for trusted location request applications and requestor identities not specifically included in any other class; and user specified classes including location request applications and requestor identities identified by a URL or other identification data that may be provided with position request data.

Each Privacy Class has an associated set of Privacy Rules for determining the response of the Privacy Engine to location requests. Examples include, without limitation: a rule specifying unrestricted access; a rule for default denial of access; a rule for access contingent on user notification and required approval; a rule for access with user notification but without required approval; a rule for access denial during user-selected time periods; a rule for access only for a defined approximation of location; etc. The Privacy Policy, the Privacy Classes, and the Privacy Rules determine how the Privacy Engine responds to each and all location requests.

Advantageously, using the present inventive enhanced user privacy methods and apparatus, the Privacy Policy for a specific Mobile Station may be controlled or modified by the user via the User Interface in the Mobile Station. In one exemplary embodiment, the User Interface comprises a user interface having suitable input means such as a stylus, pointing device or keypad. In another embodiment of the present inventive concept, the Privacy Policy is controlled via a network application that connects to the Mobile Station through a wireless data network. In a further embodiment of the present inventive method, Privacy Policy may be controlled by an application residing in a local device, such as a laptop computer or personal digital assistant, wherein the device is operatively connected to the Mobile Station.

Advantageously, the Mobile Station's Privacy Engine, including an initial Privacy Policy, may be received by (i.e., downloaded to) the Mobile Station via a wireless data network.

BRIEF DESCRIPTION OF THE DRAWINGS

FIGS. 2(a)–2(d) shows a flow diagram of an exemplary method for providing Enhanced User Privacy in a Location Services application for use by Mobile Stations and other wireless communication devices.

Like reference numbers and designations in the various drawings indicate like elements.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein.

Figure 1:
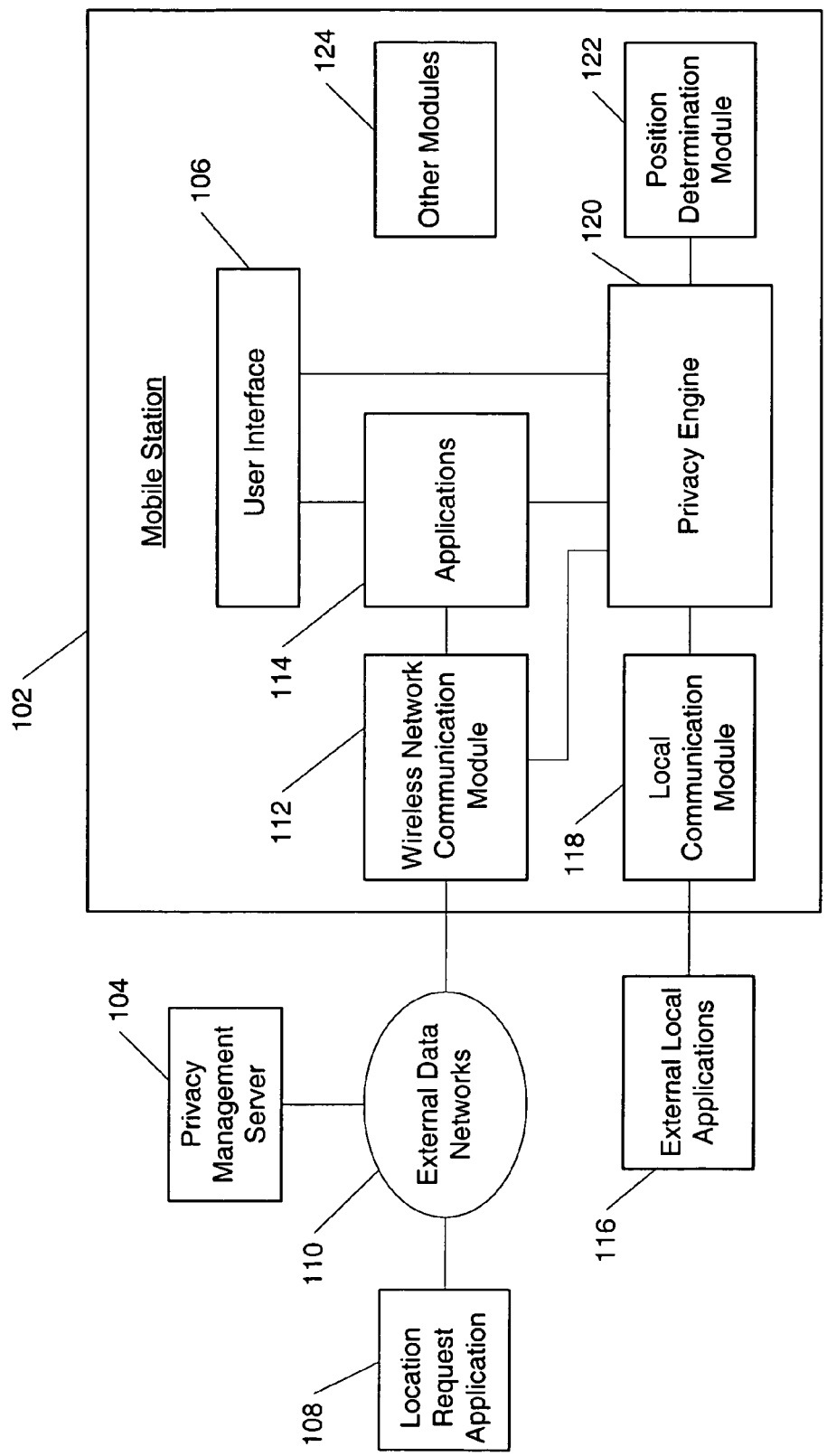
FIG. 1 is a block diagram of an exemplary communication system including a Mobile Station having a Privacy Engine adapted for use with the present inventive concept.

FIG. 1 shows a block diagram of a wireless communication device and wireless communication system that can be adapted for use with the present inventive concept. As shown in FIG. 1, one exemplary embodiment includes a Mobile Station 102 comprising a User Interface 106, a Wireless Network Communication Module 112, an Applications block 114, a Local Communication Module 118, a Privacy Engine 120, a Position Determination Module 122, and Other Modules 124.

As shown in FIG. 1, in one embodiment of the present inventive concept, the Wireless Network Communication Module 112 provides a wireless data connectivity between the Mobile Station 102 and external data networks 110. The external data networks 110 may comprise a variety of network systems. For example, in one embodiment an external data network may comprise wireless service provider network. As another example, an external data network may be an Internet Service Provider that provides a connection to receive and transmit data between the Mobile Station and the Internet. In general, the external data networks 110 comprise any data system capable of transmitting and receiving data to and from a Mobile Station using wireless communication. As shown in FIG. 1, the Wireless Network Communication Module 112 is also operatively coupled to the Applications block 114 and the Privacy Engine 120. The Wireless Communication Module 112 receives and transmits data from the Application block 114 and the Privacy Engine 120.

In one embodiment, the Applications block 114 comprises location applications that may require a position estimate of the Mobile Station. These location applications may be MS resident, which do not need interaction with the network, or may involve interaction with a location server in the network (e.g. module 108) and therefore act as a location client. For this exemplary embodiment the Applications block 114 also comprises other applications relating to network data communications and other functions of Mobile Station. Examples of such applications include, without limitation: email clients, web browsers, ftp clients, and other software applications for receiving or downloading data, data files and software instructions to the Mobile Station 102. The Applications block 114 is coupled to the Wireless Communication Module 112 to receive and transmit data and thereby communicate with the external data networks 110. The Applications block 114 is also operatively coupled to the User Interface 106 to receive and transmit data for user operation and communication with various applications. The Applications block 114 is further operatively coupled to the Privacy Engine 120 to receive and transmit data. Such data may comprise location request and response data. Such data may also comprise received or downloaded software instructions to create, modify, and implement functions and capabilities of the Privacy Engine 120. Alternatively, data to create, modify or implement functions of the Privacy Engine may be received directly from the Wireless Communication Module 112, which is also operatively coupled to the Privacy Engine 120 to receive and transmit data. As a further alternative, data to create, modify or implement functions of the Privacy Engine may be received and executed by components of the Mobile Station not shown in FIG. 1. Such components are well known to those skilled in the communications arts, and may, for example, comprise Application Specific Integrated Circuits (ASICs), Application Programming Interfaces (API), Random Access Memory (RAM), Read Only Memory (ROM), etc. Exemplary methods and systems for downloading and executing applications in Mobile Stations via wireless networks are described by Lundblade, et al., "Safe Application Distribution and Execution in a Wireless Environment," U.S. Patent Application Publication No. US 2002/0183056 A1, Dec. 5, 2002.

The Local Communication Module 118 provides a means for optionally receiving and transmitting data between the Mobile Station 102 and an external local applications module 116. In one embodiment, the external local applications module 116 resides on a locally connected device such a personal computer, laptop, or personal digital assistant. The Module 118 provides connectivity to the locally connected device. The Local Communication Module 118 is also operatively coupled to the Privacy Engine 120 to receive and transit data. Such data may include software instructions that create, modify, and implement the functions and capabilities of the Privacy Engine 120. Additionally, these data may include input and output data for location applications (applications requiring location data) that are running on a separate device such as a laptop that is connected to the MS via infrared, Bluetooth, USB cable, or other means that are distinct from the network connectivity provided by the Wireless Communication module 112. Routing these location data to the Privacy Engine 120 facilitates privacy management for location requests by local applications as described hereinbelow.

As described above, the Privacy Engine 120 is coupled to the elements 112, 114, and 118 to receive and transmit data. The Privacy Engine 120 is also coupled to receive and transmit data with the User Interface 106, the Position Determination Module 122, and the Other Modules 124. The functions and operation of the Privacy Engine 120 are specified hereinbelow.

The User Interface 106 provides a means for a Mobile Station user to receive information from, provide instructions to, and operate the applications and functions embodied in the Applications block 114 and the Privacy Engine 120. The User Interface 106 may, for example, comprise a graphical user interface and suitable input means such as a touch screen, pointing device or keypad. The User Interface 106 may also comprise means to transmit and receive sounds, voice commands, or any other means for receiving information from, providing instructions to, and operating the software modules, applications and digital devices coupled to the Mobile Station 102.

The Position Determination Module (PDM) 122 generates data that represents the location of the Mobile Station 102. One well known example of a suitable PDM employs a Global Positioning System (GPS) device or method. However, the current teachings comprehend the utilization of any PDM having a capability for providing position or location data to the Mobile Station 102. For example, the PDM may employ such well known positioning methods as assisted GPS (AGPS), Advanced Forward Link Trilateration (AFLT), Time of Arrival (TOA), Enhanced Observed Time Difference (E-OTD), positioning based on identifying the wireless communication cells within which the MS is operating (cell-based positioning), etc. These methods are well known to persons skilled in the communication arts and do not require description herein.

The Other Modules block 124 represents software modules and hardware components for implementing or augmenting functions of the Mobile Station. These software modules and hardware components may, for example, include Application Specific Integrated Circuits (ASICs), Application Programming Interfaces (API), Random Access Memory (RAM), Read Only Memory (ROM), a Subscriber Identity Module (SIM) or Universal Subscriber Identity Module (USIM), a camera, etc. Although the connections for the Other Modules block 124 are not shown in FIG. 1, persons skilled in the art will readily understand how the modules and components in the Other Modules block 124 are operably coupled within the Mobile Station as required for functionality.

Referring still to FIG. 1, in one exemplary embodiment, a Privacy Management Server 104 comprises a software application that is connected to the external data networks 110 to receive and transmit data. The Privacy Management Server 104 is coupled to the external data networks 110 to exchange data with the Wireless Network Communication Module 112. The Privacy Management Server 104 communicates with the Privacy Engine 120 via the external data networks 110 and the Wireless Network Communication Module 112. The Privacy Management Server 104 may receive and transmit data to the Network Applications block 114 via the external data networks 110 and the Wireless Network Communication Module 112. Data conveyed between the Privacy Management Server 104, the Network Applications block 114, and the Privacy Engine 120 may include software instructions that create, modify, and implement the functions or capabilities of the Privacy Engine 120. Likewise, data conveyed between the Privacy Management Server 104 and the Privacy Engine 120 via the Communication Module 112 may include software instructions that create, modify, and implement the functions and capabilities of the Privacy Engine 120. In general, data conveyed between the Privacy Management Server 104 and the elements comprising the Mobile Station 102 may be used to create, modify or implement software modules within the Mobile Station 102 that facilitate or relate to LCS and privacy management.

The Location Request Application block 108 of FIG. 1 represents Location Request Applications connected via the external data networks 110 to receive and transmit data to the Mobile Station 102. Location Request Applications 108 is coupled, via the external data network 110 and the Wireless Network Communication Module 112, to receive and transmit data to the Privacy Engine 120. The transmission and reception of Position Request and position reply data between the Location Request Applications block 108 and the Privacy Engine 120 is described hereinbelow.

Exemplary Privacy Policy

In one exemplary embodiment, the Privacy Engine 120 is a software module that performs operations to control the responses of the Mobile Station to requests for location information. These requests are herein referred to as location requests or, equivalently, as position requests.

The Privacy Engine further includes a Privacy Policy. The Privacy Policy is a component of the Privacy Engine that includes Privacy Classes for classifying location requestors and their associated location requests, and Privacy Rules for determining the response to location requests for each Privacy Class.

A Privacy Class is defined by a list of location requestors and applications. The location requestors and applications may be individually specified, or grouped into categories or types, based on identifying information such as a URL, an Internet domain, or other data which may be supplied with a position request. A location request is classified according to the location requester. Location requests can thereby be assigned to a Privacy Class based on information provided with the location request. Examples of Privacy Classes include, without limitaion: a default Privacy Class for unknown or undeclared location request applications and requestor identities not specifically included in any other class; a default Privacy Class for trusted location request applications and requestor identities not specifically included in any other class; and user specified classes including location request applications and requestor identities identified by a URL or other identification data that may be provided with position request data.

Each Privacy Class has a related set of Privacy Rules for determining the response of the Privacy Engine to location requests. Examples include, without limitation: a rule specifying unrestricted access; a rule specifying default denial of access; a rule specifying access contingent on user notification and required approval; a rule specifying access with user notification but without required approval; a rule specifying access denial during user-selected time periods; a rule specifying access only for a defined approximation of location; etc. The Privacy Policy, the included Privacy Classes, and the included Privacy Rules determine how the Privacy Engine responds to each and all location requests.

Exemplary Initialization and Software Upgrade Method

In one exemplary embodiment of the present inventive concept, a Mobile Station without user privacy control can be initially provided with software modules to implement Enhanced User Privacy for Mobile Station LCS by receiving or downloading data from a network server. The software data and instructions for installing and operatively implementing the Privacy Engine 120 (FIG. 1), including an initial Privacy Policy, can be received or downloaded to the Mobile Station 102 from a network server (for example, the Privacy Management Server 104 of FIG. 1, or other network servers not shown) via the Wireless Communication Module 112. Receiving and installing the received or downloaded data may be performed by a browser or other component in the Network Applications module 114 or by components included in the Other Modules 124. Methods for receiving or downloading applications and software modules to Mobile Stations via a wireless network connection are well known to persons of ordinary skill in the wireless communications arts. As noted hereinabove, exemplary methods and systems for downloading and executing applications in Mobile Stations via wireless networks are described by the Lundblade reference. In one embodiment, the Mobile Station includes a software platform to assist interfacing applications to the Mobile Station, such as the Binary Runtime Environment for Wireless™ (BREW) software developed by QUALCOMM Incorporated, headquartered in San Diego, Calif.

Software upgrades and modifications of the Privacy Engine 120 (still referring to FIG. 1), the Privacy Policy and other Mobile Station software modules and components can also be received or downloaded from a network server as described above. In particular, the user (or other entity having permission to do so), may update the Privacy Policy using the wireless network connection. Alternatively, the user may also update the Privacy Policy using the User Interface 106. In another alternative, the user may update the Privacy Policy by inputting data using an external local application (as represented by External Local Applications block 116) connected via the Local Communication Module 118. In yet another alternative, the user may input user-specific Privacy Policy data using an removable data storage device (not shown in FIG. 1). User-specific Privacy Policy data include Privacy Classes and Privacy Rules that may be selected, modified or created according to the requirements or preferences of the mobile station user. In one advantageous embodiment of the present inventive concept, the Mobile Station 102 is provided by the manufacturer or service provider with an initial or default Privacy Engine that includes a generic Privacy Policy. The generic Privacy Policy is then customized by the user to include user-specific Privacy Classes and Privacy Rules by one or more of the following methods: 1) downloading user-specific Privacy Policy data from a network; 2) inputting user-specific Privacy Policy data using the User Interface; 3) using an external local application in a locally connected device to input user-specific Privacy Policy data; or 4) using a removable data storage device to input previously stored user-specific Privacy Policy data. An exemplary implementation of removable data storage devices, such as Subscriber Identity Modules, Universal Subscriber Identity Modules or Removable Identity Modules, is described hereinbelow.

Exemplary Method of Operation for Enhanced User Privacy Control

FIGS. 2(*a*)–2(*d*) illustrate a unified flow-chart diagram for an exemplary method of Enhanced User Privacy for use in Mobile Station LCS. Flow connections between FIGS. 2(*a*) and 2(*b*) are represented by the elements 214, 220, 230, and 232. Likewise, flow connections between FIGS. 2(*a*) and 2(*c*) are represented by the elements 202, 208 and 223. Flow connection between FIGS. 2(*b*) and 2(*c*) is represented by the element 258. Flow connections between FIGS. 2(*b*) and 2(*d*) are represented by the elements 214 and 246. Flow connection between FIGS. 2(*c*) and 2(*d*) is represented by the element 246.

The element 202 in FIG. 2(*a*) represents a state during which the Privacy Engine 120 (FIG. 1) awaits reception of a request for location data information (i.e., a position request). At the STEP 204 the Privacy Engine 120 receives a position request via the data connections described hereinabove with reference to FIG. 1. In reference to the present exemplary implementation, the Position Request data may comprise any of the following information: 1) network address and type of Location Request Application; 2) requestor category (e.g., emergency service, commercial service, individual person); 3) requestor identity, if applicable; 4) code word or digital certificate for verification of requestor identity; 5) requested Quality of Service (QoS). It shall be obvious to those of ordinary skill in the communications arts that the scope of the present teachings comprehends use of other types of Position Request data such as, for example, geographical area information, user information, requestor information, coordinate system, etc., as may be required to implement other embodiments.

Referring again to FIG. 2(*a*), at the STEP 206, a Position Request Counter is initialized to a value of zero. The value zero represents the case where only one Position Request has been received. If subsequent Position Requests are received while a first Position Request is being processed, the Position Request Counter is incremented and decremented as described hereinbelow. The purpose of the Position Request Counter is for management of multiple concurrent position requests.

The element 208 represents a flow connection from FIG. 2(*c*). As described below, position Request data will be processed by the inventive method subsequent to a STEP 286 of FIG. 2(*c*) via the flow connection 208 only if a subsequent Position Request is received while a prior Position Request is being processed.

At the STEP 210, the Privacy Engine 120 (FIG. 1) invokes a selected Privacy Policy that assigns a Privacy Class to the Position Request received during STEP 204 (or via the element 208). As described above, the Privacy Policy comprises a list for assigning Privacy Classes to Position Requests, and Privacy Rules for decisions based on the assigned Privacy Classes.

Referring again to FIG. 1, the Privacy Engine 120 may optionally invoke the Applications module 114 the Other Modules 124, or Mobile Station modules and components not shown in the Figure, to perform classification of the Position Request data. For example, a network application may be invoked to verify digital certificate data.

Referring again to FIG. 2(a), at a STEP 212 the Position Request data are evaluated to determine whether the Position Request is an Emergency Service Request. In accordance with usual statutory requirements, an Emergency Service Request shall override the Privacy Policy, and position data shall be returned to the requester as expeditiously as possible. For an Emergency Service Request the method proceeds via the flow connection 214 to a Step 256 (FIG. 2(b)) to bypass the Privacy Policy and the expedite response. For a non-emergency request, the method proceeds to a STEP 216.

At the STEP 216 the Position Request data are evaluated to determine if there are other requirements that necessitate overriding the Privacy Policy. For example, certain coutries may require an override for requests originating from law enforcement or other government agencies. If an override is required, the method proceeds via the flow connection 214 to the STEP 256 to expedite processing. If an override is not required, the method proceeds to a STEP 218.

Referring again to FIG. 2(a), at the STEP 218, the Privacy Engine 120 FIG. 1) invokes the Privacy Policy to determine whether the Position Request should be denied based on the rules associated with the Privacy Class assigned to the request. Denial of a request position information may be determined based upon a plurality of criteria. In a first example, the request may be denied because the requestor is a commercial entity, and the assigned Privacy Class for commercial entities specifies automatic denial. In a second example, the request may be denied because the requester identity is a private individual who has been placed in a Privacy Class with a rule specifying automatic denial. In a third example, the request may be denial because the Position Request data does not include a digital certificate or password that verifies identify of the requester, and the default Privacy Class for this category includes a rule specifying automatic denial. In a fourth example, the user may have chosen to designate that all Position Requests, other than those related to emergency services, be placed in a Privacy Class specifying automatic denial during specified time periods. It will be obvious to those skilled in the wireless communications art that many other examples are comprehended within the scope of the present teachings.

If a decision is made at the STEP 218 to deny the Position Request, then no position will be computed and the method proceeds to a STEP 222 whereat a denial of service message is transmitted to a Location Request Application. As described below in more detail in reference to the description of the flow diagram of FIG. 2(b), the STEP 222 may also be implemented via flow connection 220 following STEPS 238 or 242 of FIG. 2(b). Following the STEP 222, the inventive method proceeds to a STEP 282 of FIG. 2(c) via the process flow connection 223. As will be explained more fully hereinbelow, at the STEP 282 the method checks the Position Request Counter to determine whether additional position requests are queued before either returning to the idle state process STEP 202, or executing further process steps.

Returning to FIG. 2(a), if a determination is made at the decision STEP 218 that the request should not be denied, a Privacy Policy is invoked at a STEP 224 to determine whether user notification is required. If user notification is determined not to be required at the STEP 224, the inventive method proceeds via the flow connection 230 to a STEP 250 of FIG. 2(b) for further processing. This is described in more detail below in regard to the description of FIG. 2(b).

If user notification is determined at the STEP 224 to be required, then at a STEP 226 notification is conveyed to the user via the User Interface 106 (FIG. 1). The User Interface 106 may employ a sound, image, vibration, or other means to alert the user that a Position Request has been granted, and graphical, text, or audible display or other presentation may be used to convey information relating to the Position Request, such as requestor category, requestor identity, and/or requested QoS.

At a STEP 228 the Privacy Engine 120 invokes the Privacy Policy to determine if the Position Request requires user response in addition to user notification. If not, then the inventive method proceeds via flow connection 230 to the STEP 250 of FIG. 2(b) for further processing. If a user response is required, then a timed wait for user response is initiated at a STEP 232.

Figure 2B:
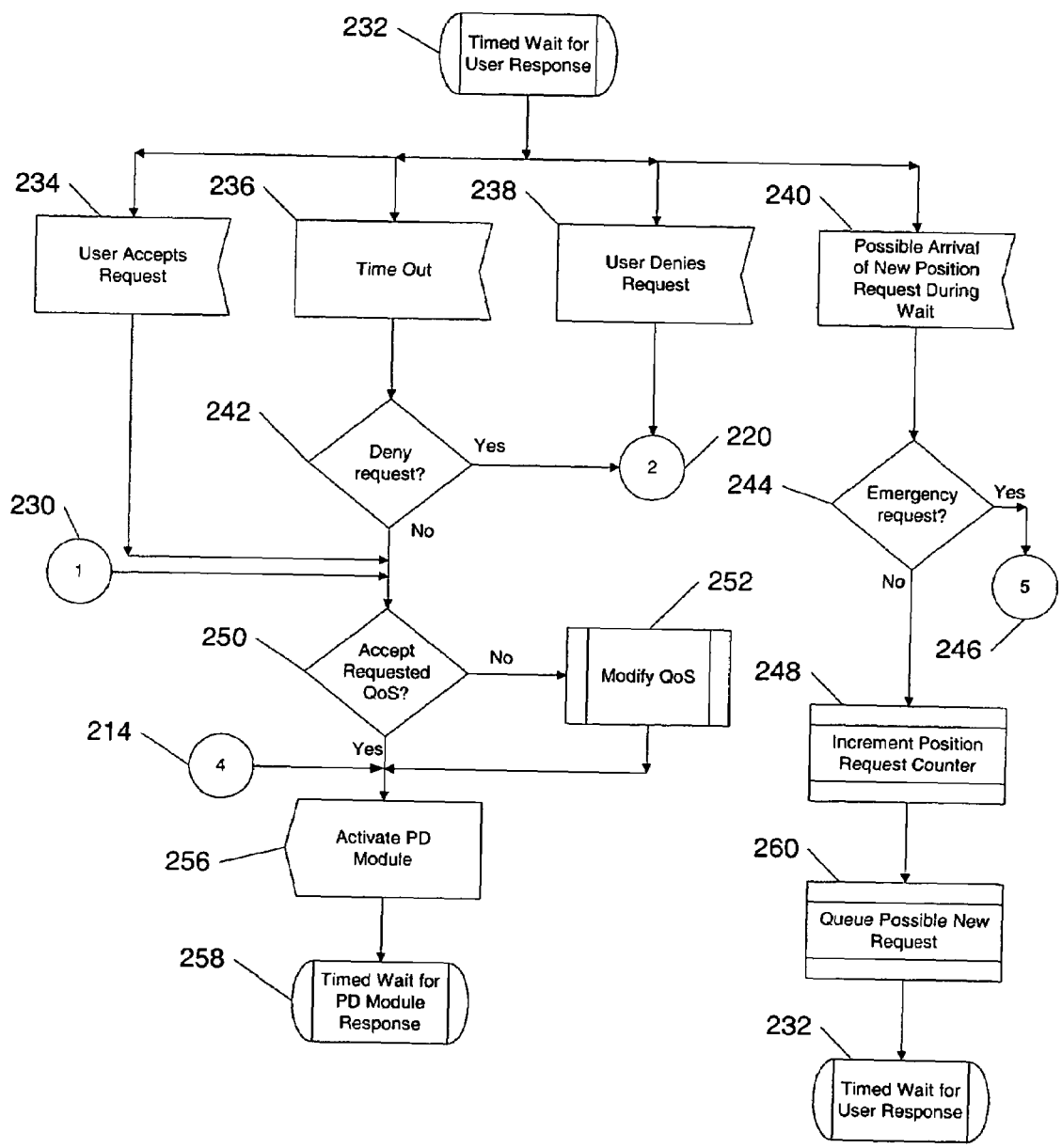
Figure 2C:
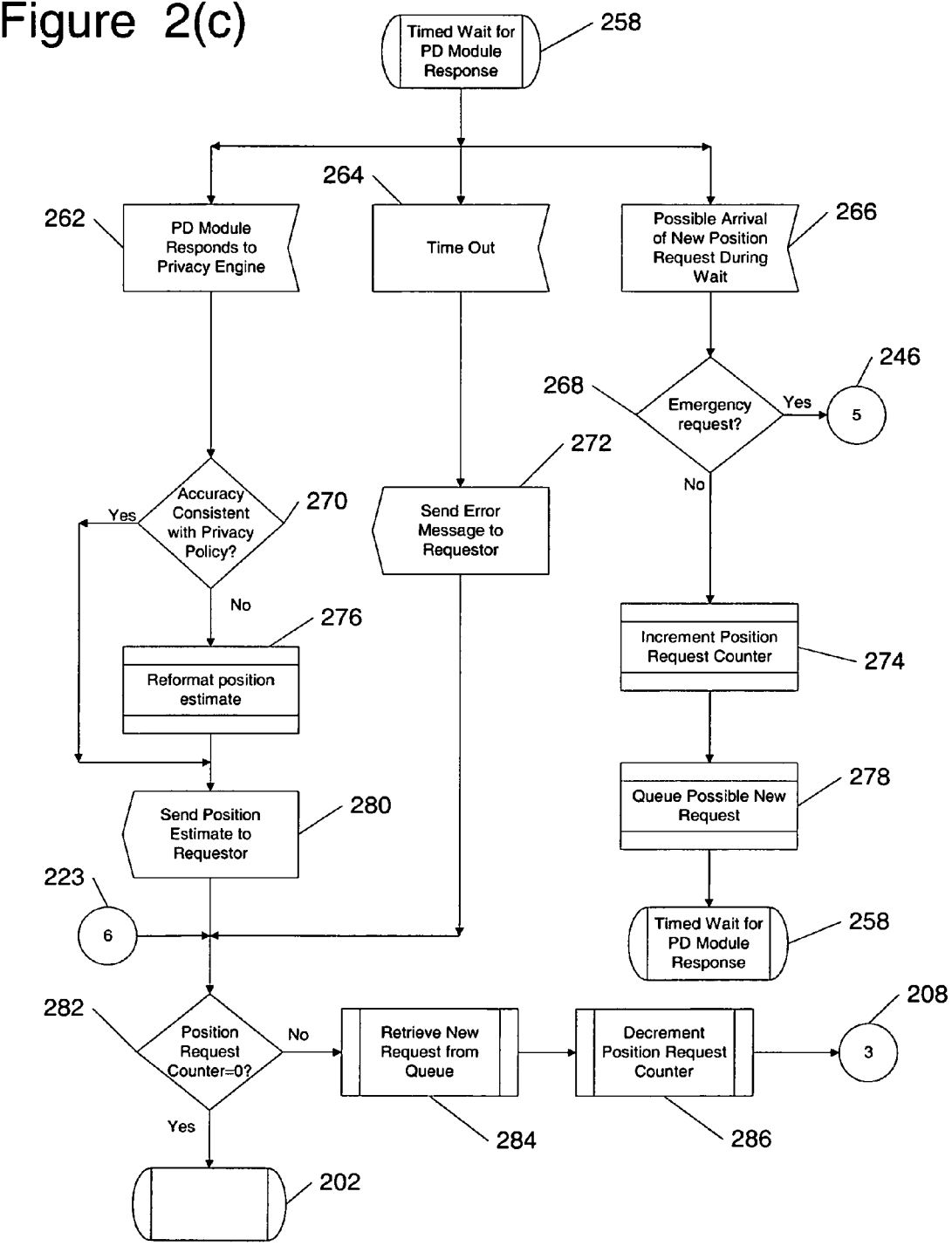
Figure 2D:
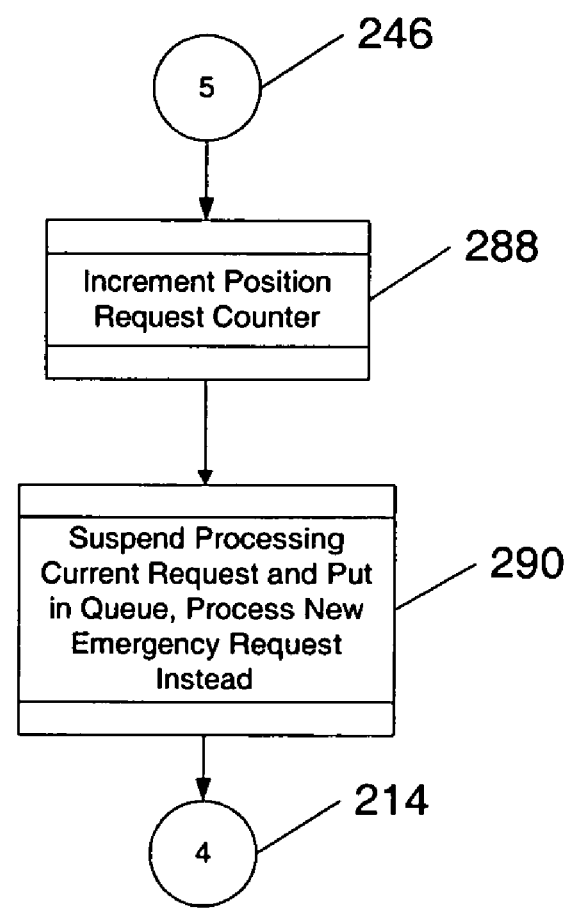

FIG. 2(b) is a continuation of the unified flow diagram of FIG. 2(a)–2(c), proceeding from the STEP 232 (timed wait for user response). STEPS 234, 236, and 238 represent possible events that may terminate the timed wait period at the STEP 232. The STEP 240 represents an event that may occur during the timed wait period at the STEP 232.

If the timed wait for user response at the STEP 232 is terminated by the event represented at the STEP 234, User Accepts Request, then Position Request data are transferred to the STEP 250 for further processing.

If the timed wait for user response at the STEP 232 is terminated without user response by the event represented at the STEP 236, Time Out, then Position Request data are transferred and the method proceeds to a STEP 242 for further processing. The STEP 242 invokes the Privacy Policy to determine if an absence of user response requires denial. If an absence of user response requires denial, then the inventive method proceeds via the flow connection 220 to the STEP 222 (shown in FIG. 2(a)). If absence of user response does not require denial, then the method proceeds to the STEP 250 for further processing.

If the timed wait for user response of the STEP 232 is terminated by the event represented at the STEP 238 (User Denies Request), then the inventive method proceeds via the flow connection 220 to the STEP 222, shown in FIG. 2(a).

As shown in FIG. 2(b), if a new Position Request is received during the timed wait of the STEP 232, i.e., the event represented at the STEP 240 (Possible Arrival of New Position Request During Wait) occurs prior to the termination of the timed wait for user response, then the new Position Request data received by the Privacy Engine 120 (FIG. 1) are transferred, and the method proceeds to a STEP 244.

Still in reference to FIG. 2(b), at the STEP 244 the new Position Request is evaluated to determine whether the request is an Emergency Service Request. For an Emergency Service Request the method proceeds via the flow connection 246 to a STEP 288 (FIG. 2(d)). At the STEP 288 the Position Request Counter is incremented and the method proceeds to a STEP 290. At the STEP 290 the processing for the prior Position Request is suspended and placed in a queue for subsequent processing, as explained hereinbelow. In another embodiment (not shown) the method may instead abort processing of the prior Position Request at the STEP 290. In yet another embodiment (not shown), means are provided to enable the PD module 122 (FIG. 1) to process a plurality of simultaneous requests. Following the STEP 290, the method proceeds to the STEP 256 (FIG. 2(b)) via the flow connection 214 for expedited processing of the Emergency Service Request. If the new request is not an emergency request, the method proceeds directly from the STEP 244 to a STEP 248 (FIG. 2(b)).

At the STEP 248 the Position Request Counter is incremented. The method then proceeds to a STEP 260 and the new Position Request data are transferred to queuing. At the STEP 260, the method places the new Position Request data into a data queue. After completion of the STEP 260 the inventive method returns to the STEP 232, and awaits a response from the user. In alternative embodiments additional steps may be inserted and implemented prior to the STEP 248 for the purpose of deciding whether the new Position Request should be denied instead of queued. In these embodiments it may be advantageous to deny unacceptable requests if the added steps result in an overall improvement in efficiency. In one example, a request that stipulates an unacceptable QoS may be denied at once rather than placed in queue.

As shown in FIG. 2(b), the STEP 250 may be entered from any of the STEPS 234, 242, or (via flow connection 230) the STEP 228 (FIG. 2(a)). At the STEP 250, Position Request data designating QoS are compared with Privacy Rules that apply for the current Position Request. For the purpose of describing the exemplary implementation, QoS may represent the accuracy of position data to be returned to the Location Request Application. The position data may comprise latitude and longitude coordinate data in conjunction with QoS data representing the accuracy of the position estimate. If the QoS specified by the Position Request data complies with limits specified by the Privacy Rules applicable for the present Position Request, the method proceeds to a STEP 256. If the QoS specified by the Position Request data do not comply with Privacy Policy limits, the QoS data are modified for compliance in a STEP 252 before further processing at the STEP 256. Further discussion to clarify the purpose and use of QoS specifications will be given in the Exemplary Applications section described hereinbelow.

At the STEP 256, the method activates the PD module 122 (FIG. 1) in order to retrieve position data in accordance with Position Request data and current Privacy Policy specifications. As described hereinabove, when emergency or other privacy override requests are received, the method may implement STEP 256 via the flow connection 214, following from the STEPS 212, 216 (FIG. 2(a)) or the STEP 290 (FIG. 2(d)). The method then proceeds to a STEP 258. At the STEP 258, the method performs a timed wait for the PDM 122 response.

FIG. 2(c) is a continuation of the unified flow diagram of FIG. 2, proceeding from the timed wait at the STEP 258 (FIG. 2(b) (timed wait for PDM response). The STEPS 262 and 264 represent events that may terminate the timed wait period of the STEP 258. The STEP 266 also represents an event that may occur during the timed wait period STEP 258. These steps are described in more detail in the following paragraphs.

As shown in FIG. 2(c), if the timed wait for the PDM response at the STEP 258 is terminated by the event represented at the STEP 262, i.e., if the PDM 122 responds to the Privacy Engine 120 (FIG. 1), the method proceeds from the STEP 262 to a decision STEP 270. If the timed wait of the STEP 258 "times-out", i.e., is terminated by the event represented at the STEP 264, (Time Out), the method proceeds from the STEP 264 to a STEP 272 and an error message is transmitted to the Location Request Application. In alternative embodiment (not shown), position information previously stored may be transmitted in place of an error message. Following the STEP 272, the method proceeds to a STEP 282 to test for pending position requests in the new position request queue.

As shown in FIG. 2(c), if new position requests occur during the STEP 258, the method proceeds to a STEP 266 (Possible Arrival of New Position Request During Wait). At the STEP 266, new Position Request data is received by the Privacy Engine 120 (FIG. 1). At the following STEP 268 the new Position Request is evaluated to determine whether the request is an Emergency Service Request. For an Emergency Service Request the method proceeds via the flow connection 246 to a STEP 288 (FIG. 2(d)) for subsequent processing steps as described hereinabove. If the new request is not an emergency request, the method proceeds directly from the STEP 268 to a STEP 274.

At the STEP 274, the method increments the Position Request Counter. At a following STEP-278, the method places new Position Request data into a data queue. After completion of the STEP 278 the method returns to the STEP 258 to continue to perform a timed wait for PDM response.

When the timed wait at the STEP 258 is interrupted by the PDM 122 responding to the Privacy Engine 120 (FIG. 1), the method proceeds from the STEP 258 to the STEP 262 as shown in FIG. 2(c). At the STEP 262, PDM data are transferred from the PDM 122 at the STEP 262, to the Privacy Engine 120. The PDM data comprise position coordinate data and QoS data. At the STEP 270, PDM data designating QoS are compared with Privacy Rules relating to the Privacy Class of the current Position Request. For the purpose of describing the exemplary implementation, QoS may represent an estimated accuracy of PDM position coordinate data to be returned to the Location Request Application. The PDM data, for example, may comprise latitude and longitude data in conjunction with QoS data representing the accuracy of the position estimate. If the QoS of the PDM data complies with limits specified by the Privacy Rules relating to the Privacy Class of the current Position Request, the methods proceeds to a STEP 280 for further processing. If the QoS specified by the PDM data do not comply with Privacy Policy limits for the present instance, then the QoS data are modified for compliance at a STEP 276. After the position estimate is reformatted at the STEP 276, the method proceeds to the STEP 280. More detailed description of the purpose and use of QoS specifications is provided below in the Exemplary Applications section.

The PDM data are transmitted to the Location Request Application at the STEP 280. The method then proceeds to the STEP 282, whereat the Position Request Counter is interrogated to determine if new Position Requests are pending. If the counter value is determined to be zero, indicating that no pending requests are present, then the method returns to the wait state 202 (FIG. 2(a)). If the counter value is an integer greater than zero, then the method proceeds to a STEP 284. At the STEP 284, new Position Request data are retrieved from the new Position Request data queue.

The method then proceeds to a STEP 286, whereat the Position Request Counter is decremented. The method then proceeds (via the flow connection 208) to the STEP 210 (FIG. 2(a)) to further process new Position Request data.

Exemplary Applications

In a typical application of the present teachings, several user-configurable Privacy Classes, and properties or rules appertaining thereto, can be defined. As described above in reference to FIG. 1, user configurability may be effected via data connections between the Privacy Engine 120 and the User Interface 106, the Privacy Management Server 104 (or other network servers not shown in the Figures), or the External Local Applications 116. It is desirable to permit configuration and modification of the Privacy Engine 120 and Privacy Policy by secure means only. By way of example, secure means may comprise methods and means for providing secure digital communication, use of passwords, digital certificates, and other well known identity verification and authentication methods.

Privacy Classes may include, without limitation, the following types:
1. default for unknown or undeclared (i.e., non-trusted) Location Request Applications and requester identities not specifically included in any other class;
2. default for trusted Location Request Applications and requester identities not specifically included in any other class; and
3. user specified classes including Location Request Applications and requestor identities.

Each Privacy Class may include, without limitation, the following Privacy Rules:
1. specification of default acceptance or denial, or acceptance contingent to specified restrictions;
2. specification of user notification requirements:
   2.a. user notification absolutely required or not required, notification based on requested QoS (e.g., the user specifies that notification is required for position estimates more accurate than 10 meters. Hence, if Position Request data specifies QoS for position estimate with 5 meters accuracy, the user shall be notified.), and
   2.b. notification based on whether the request is periodic or initiated on demand;
   2.c. notification based on time of occurrence, such time of day, day of week, date, or similar time-dependent restrictions.
3. specification of display mode to be used for user notification (e.g., pop-up icon in graphical user interface, notification by tone, music or other sound, notification by vibration, etc.), and information to be displayed, if any;
4. specification of notification requirements related to periodic requests such as whether explicit notification is required for each periodic request or required only for the first request of a periodic series;
5. specification of QoS or position estimate accuracy to be delivered (e.g., a Privacy Policy class may be permitted only zip code accuracy, or permitted only for accuracy to within a radius greater than a specified number of meters);
6. specification of the default handling if the user does not respond to a notification (e.g., request allowed or not allowed when the user does not respond to a notification such as a pop up window, with or without an "OK" button, which automatically disappears after a few seconds);
7. specification of variable rule configurations based upon the Mobile Station location or the time of the day. [For example, the user may establish a rule modifying or prohibiting a response from certain locations or at certain times of day.]

In one embodiment of the present inventive concept, the Mobile Station 102 (FIG. 1) may include a Subscriber Identity Module (SIM), a Universal Subscriber Identity Module (USIM) or a Removable User Identity Module (RUIM). SIM, USIM and RUIM devices are removable storage components for Mobile Stations that enable secure storage of user-specific information. As previously described in reference to FIG. 1, the SIM, USIM or RUIM device may be included in the Other Modules block 112. In this exemplary embodiment, user-specific Privacy Policy data are stored in the SIM, USIM or RUIN device. The devices are operatively coupled to the Privacy Engine 120 (connection not shown in FIG. 1), and the user-specific Privacy Policy data are transmitted to the Privacy Engine 120 for implementation of the Privacy Engine 120 operations described hereinabove. User-specific Privacy Policy data are also received from the Privacy Engine for storage. This occurs when the Privacy Policy data are initially received for storage by the SIM, USIM or RUIM device, and when the data are changed or updated. When the SIM, USIM or RUIN is removed from the Mobile Station 102, the user-specific Privacy Policy information may then be advantageously deleted automatically from the Privacy Engine 120. The use of SIM, USIM or RUIN devices for removable storage of user-specific data in Mobile Stations is well known to persons skilled in the communication arts. Standards for implementation of SIM devices are described in the reference 3rd Generation Partnership Project (3GPP), Technical Specification (TS) Group Terminals, Subscriber Identity Module Application Programming Interface (SIM API), Stage 1, Release 1999, (3GPP TS 02.19 V8.0.0), June, 2001. This reference is hereby fully incorporated by reference herein as though set forth in full, for teachings relating to implementation of SIM devices. It will also be obvious to persons skilled in the art that the present teachings encompass embodiments wherein other removable storage devices (such as smart cards or memory sticks) are included in a Mobile Station and used in conjunction with the Privacy Engine for storage of user-specific Privacy Policy data.

In light of the examples provided in the description above, those of ordinary skill in the communications art shall recognize that the teachings herein can be broadly and generally applied to user control and management of personal privacy information relating to LCS.

Those of ordinary skill in the communications and computer arts shall also recognize that computer readable medium which tangibly embodies the method steps of any of the embodiments herein may be used in accordance with the present teachings. For example, the method steps described above with reference to FIGS. 2(a)–2(c) may be embodied as a series of computer executable instructions stored on a the computer readable medium. Such a medium may include, without limitation, RAM, ROM, EPROM, EEPROM, floppy disk, hard disk, CD-ROM, etc. The disclosure also includes the method STEPS of any of the foregoing embodiments synthesized as digital logic in an integrated circuit, such as a Field Programmable Gate Array, or Programmable Logic Array, or other integrated circuits that can be fabricated or modified to embody computer program instructions.

The Mobile Station 102 in accordance with the present teachings may include, without limitation: wireless telephone, a personal digital assistant with wireless communication capability, a laptop with wireless communication capability, and any other mobile digital device for personal communication via wireless connection.

A number of embodiments of the present inventive concept have been described. Nevertheless, it will be understood that various modifications may be made without departing from the scope of the concept as disclosed herein. For example, the methods can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order, except for those embodiments described in a claim that include a specified order for the steps.

Accordingly, it is to be understood that the inventive concept is not to be limited by the specific illustrated embodiments, but only by the scope of the appended claims. The description may provide examples of similar features as are recited in the claims, but it should not be assumed that such similar features are identical to those in the claims unless such identity is essential to comprehend the scope of the claim. In some instances the intended distinction between claim features and description features is underscored by using slightly different terminology.

What is claimed is:

1. A privacy control system for use in a mobile station, wherein the mobile station communicates with a wireless communication system, and wherein the privacy control system provides geographical location information associated with the mobile station, comprising;
   a) a Privacy Engine, including a Privacy Policy component having at least one Privacy Rule, wherein the Privacy Engine receives location requests related to the geographical location of the mobile station generated by a location requestor external to the mobile station, and determines whether to respond to the location request based in part on the at least one privacy rule; and
   b) a Position Determination Module (PDM), operatively coupled and responsive to the Privacy Engine, wherein the PDM provides estimates of the geographical location of the mobile station to the Privacy Engine; wherein, the Privacy Engine receives the geographical location estimates from the PDM, and selectively responds to the location requests by processing the location estimates and providing response messages in accordance with the Privacy Policy component.

2. The privacy control system of claim 1, wherein the PPM operates according to one or more of the following methods: Global Positioning System (GPS), assisted OPS, Advanced Forward Link Trilateration, Time of Arrival, Enhanced Observed Time Difference, and positioning based on identifying wireless communication cells within which the mobile station is operating.

3. The privacy control system of claim 1, further comprising a wireless network communication module operatively coupled to the Privacy Engine and to the wireless communication system, wherein the wireless network communication module is configured to receive the location requests from the wireless communication system and to transmit the response messages to the wireless communication system, and further configured to receive data and software instructions from the wireless communication system and to transmit data and software instructions to the wireless communication system.

4. The privacy control system of claim 3, wherein the Privacy Engine comprises software that is downloaded from the wireless communication system.

5. The privacy control system of claim 3, wherein the Privacy Engine is modified wit software upgrades downloaded front the wireless communication system.

6. The privacy control system of claim 3, wherein the Privacy Policy comprises software that is downloaded from the wireless communication system.

7. The privacy control system of claim 3, wherein the Privacy Policy is modified with updates downloaded from the wireless communication system.

8. The privacy control system of claim 7, wherein rho updates include user-specific Privacy Policy data.

9. The privacy control system of claim 3, wherein the location request is received from an external application operatively connected to the wireless communication System.

10. The privacy control system of claim 1, wherein the location requests are received from a local software application executing within the mobile station.

11. The privacy control system of claim 1, flintier comprising a local communication module operatively coupled to the Privacy Engine and to external local applications, wherein the local communication module is configured to receive the location requests from the external local applications and to transmit the response messages to the external local applications, and flintier configured to receive data and software instructions from the external local applications and to transmit data and software instructions to the external local applications.

12. The privacy control system of claim 11 wherein the Privacy Engine comprises software that is downloaded from an external local application.

13. The privacy control system of claim 11, wherein the Privacy Engine is modified with software upgrades by software instructions downloaded from an external local application.

14. The privacy control system of claim 11, wherein the Privacy Policy comprises software that is downloaded from an external local application.

15. The privacy control system of claim 11, wherein the Privacy Policy is modified with updates downloaded from an external local application.

16. The privacy control system of claim 15, wherein the updates include user-specific Privacy Policy data.

17. The privacy control system of claim 11, wherein the location request is received from an external local application.

18. The privacy control system of claim 1, further comprising a User Interface, operatively coupled to the Privacy Engine, wherein the User Interface is configured to receive input from a user, and wherein the user input is used to modify the Privacy Policy with updates.

19. The privacy control system of claim 18, wherein the updates include user-specific Privacy Policy data.

20. The privacy control system of claim 18, wherein the User Interface provides notifications of location requests to the user, in accordance with the Privacy Policy, and wherein the User Interface is configured to receive responses from the user, responsive to the location request notifications.

21. The privacy control system of claim 20, wherein the Privacy Policy includes a plurality of Privacy Classes, wherein the Privacy Classes classify the location requests received by the Privacy Engine, and wherein the Privacy Policy further includes Privacy Rules that determine responses to the location requests for each Privacy Class, and wherein the Privacy Rules include at least one of the following rules:
   a) a rule requiring default acceptance or denial of a location request;
   b) a rule requiting user notification of a location request;
   c) a rule requiring user notification based upon a requested quality of service;
   d) a rule requiring user notification based upon whether the location request is periodic or initiated on demand;
   e) a rule requiring user notification based upon a time of occurrence of the location request;

f) a rule specifying a display mode to be used for user notification;

g) a rule specifying an accuracy range of the location estimate to be provided;

h) a rule requiring default handling of a response message if the user does not respond to a user notification; and i) a rule specifying response message handling bawd on current geographical location of the mobile station.

22. The privacy control system of claim 1, further comprising a removable data storage device, wherein the removable data storage device is operatively coupled to the Privacy Engine, and wherein the removable data Storage device is configured to receive, store, and transmit user-specific Privacy Policy data.

23. The privacy control system of claim 22, wherein the removable data storage device comprises a Subscriber Identity Module device.

24. The privacy control system of claim 22, wherein the removable data storage device comprises a Universal Subscriber Identity Module device.

25. The privacy control system of claim 22, wherein the removable data storage device comprises a Removable User Identity Module device.

26. A method of providing privacy control in a mobile station of the mobile station geographical location information, wherein the mobile station communicates with a wireless communication system, and wherein the mobile station includes a Privacy Engine comprising software instructions, wherein the Privacy Engine software instructions also include Privacy Policy instructions, and wherein the mobile station limber includes a Position Determination Module (PDM) capable of providing geographical location estimates of the mobile station; the method comprising the steps of:

a) receiving location requests for a current geographical location of the mobile station;

b) processing the location requests in accordance with the Privacy Engine software instructions, the Privacy Engine software instructions including Privacy Rules that determine whether to respond to the location request based at least in pan on information included in the location request;

c) obtaining geographical location estimates of the mobile station;

d) processing the location estimates in accordance with the location requests, the Privacy Engine software instructions, and the Privacy Rules; and e) selectively providing response messages responsive to the location requests, in accordance with the Privacy Engine software instructions, the location estimates and the Privacy Rules.

27. The privacy control method of claim 26, wherein the step b) of processing the location requests further includes a step of processing emergency location requests by overriding the Privacy Policy instructions to provide emergency response messages.

28. The privacy control method of claim 27, wherein the step b) of processing the location requests includes processing a plurality of concurrent location requests.

29. The privacy control method of claim 28, wherein pending location requests are suspended while the emergency location requests are processed.

30. The privacy control method of claim 26, further comprising a step of notifying a user of location requests.

31. The privacy control method of claim 30, wherein the Privacy Policy instructions include Privacy Classes for classifying the location requests received during the step a), and wherein the Privacy Policy instructions further include Privacy Rules for determining a response to the location requests for each Privacy Class, and wherein the Privacy Rules include at least one of the following rules:

a) a rule requiring default acceptance or denial of a location request;

b) a rule requiring user notification of a location request;

c) a rule requiring uses notification based upon a requested quality of service;

d) a rule requiring user notification based upon whether the location request is periodic or initiated on demand;

e) a rule requiring user notification based upon a time of occurrence of the location request;

f) a rule specifying a display mode to be used for user notification;

g) a rule specifying an accuracy range of the location estimate to be provided;

h) a rule requiring default handling of a response message if the user does nor respond to a user notification; and i) a rule specifying response message handling based on current geographical location of the mobile station.

32. An apparatus providing privacy control in a mobile station of the mobile station geographical location information, wherein the mobile station communicates with a wireless communication system, and wherein the mobile station includes a Privacy Engine comprising software instructions, wherein the Privacy Engine software instructions also include Privacy Policy instructions, and wherein the mobile station further includes a Position Determination Module (PDM) capable of providing geographical location estimates of the mobile station, comprising:

a) means for receiving location requests for a current geographical location of the mobile station;

means for processing the location requests in accordance with the Privacy Engine software instructions, the Privacy Engine software instructions including Privacy Rules that determine whether to respond to the location request based at least in part on information included in the location request;

c) means for obtaining geographical location estimates of the mobile station;

d) means for processing the location estimates in accordance with the location requests, the Privacy Engine software instructions, and the Privacy Rules; and e) means for selectively providing response messages responsive to the location requests, in accordance with the Privacy Engine software instructions, the location estimates and the Privacy Rules.

33. The privacy control apparatus of claim 32, wherein the means for processing the location requests further includes means for bypassing the Privacy Policy instructions to process emergency location requests and provide emergency response messages.

34. The privacy apparatus method of claim 33, wherein the means for processing the location requests Thither includes means for processing a plurality of concurrent location requests.

35. The privacy control apparatus of claim 34, wherein pending location requests are suspended while the emergency location requests are processed.

36. The privacy control apparatus of claim 32, further comprising means for notifying a user of location requests.

37. The privacy control apparatus of claim 36, wherein the Privacy Policy includes Privacy Classes for classifying the location requests received during step a), and wherein the Privacy Policy further includes Privacy Rules for determining a response to the location requests for each Privacy Class, and wherein the Privacy Rules include at least one of the following rules:
   a) a rule requiring default acceptance or denial of a location request;
   b) a rule requiring user notification of a location request;
   c) a rifle requiring user notification based upon a requested quality of service;
   d) a rule requiring user notification based upon whether the location request is periodic or initiated on demand;
   e) a rule requiring user notification based upon a time of occurrence of the location request;
   f) a rule specifying a display mode to be used for user notification;
   g) a rule specifying an accuracy range of the location estimate to be provided;
   h) a rule requiring default handling of a response message if the user does not respond to a user notification; and
   i) a rule specifying response message handling based on current geographical location of the mobile station.

* * * * *

UNITED STATES PATENT AND TRADEMARK OFFICE
CERTIFICATE OF CORRECTION

| | | |
|---|---|---|
| PATENT NO. | : 7,088,237 B2 | |
| APPLICATION NO. | : 10/779109 | |
| DATED | : August 8, 2006 | |
| INVENTOR(S) | : Arcens | |

It is certified that error appears in the above-identified patent and that said Letters Patent is hereby corrected as shown below:

Column 15, line 20, claim 1: "comprising;" to read as --comprising:--

Column 15, line 39, claim 2: "PPM" to read as --PDM--

Column 15, line 40, claim 2: "OPS" to read as --GPS--

Column 15, line 60, claim 5: "wit" to read as --with--

Column 15, line 61, claim 5: "front" to read as --from--

Column 16, line 01, claim 8: "rho" to read as --the--

Column 16, line 05, claim 9: "System" to read as --system--

Column 16, line 10, claim 11: "flintier" to read as --further--

Column 16, line 16, claim 11: "flintier" to read as --further--

Column 16, line 20, claim 12: "claim 11" to read as --claim 11,--

Column 16, line 60, claim 21: "requiting" to read as --requiring--

Column 17, line 07, claim 21: "bawd" to read as --based--

Column 17, line 12, claim 22: "Storage" to read as --storage--

Column 17, line 31, claim 26: "limber" to read as --further--

Column 17, line 40, claim 26: "pan" to read as --part--

Column 18, line 07, claim 31: "uses" to read as --user--

Column 18, line 19, claim 31: "nor" to read as --not--

Signed and Sealed this
Eleventh Day of October, 2011

David J. Kappos
*Director of the United States Patent and Trademark Office*

CERTIFICATE OF CORRECTION (continued)
U.S. Pat. No. 7,088,237 B2

Column 18, line 34, claim 32: "means" to read as --b) means--

Column 18, line 54, claim 34: "The privacy apparatus method" to read as --The privacy control apparatus--

Column 18, line 55, claim 34: "Thither" to read as --further--

Column 19, line 07, claim 37: "rifle" to read as --rule--